(12) United States Patent
Carlson

(10) Patent No.: US 7,044,164 B2
(45) Date of Patent: May 16, 2006

(54) FLAP-TYPE VEHICLE CABIN EXHAUSTER

(75) Inventor: Daniel D. Carlson, Fenton, MI (US)

(73) Assignee: TRW Automotive U.S. LLC, Farmington Hills, MI (US)

( * ) Notice: Subject to any disclaimer, the term of this patent is extended or adjusted under 35 U.S.C. 154(b) by 81 days.

(21) Appl. No.: 10/602,344

(22) Filed: Jun. 24, 2003

(65) Prior Publication Data

US 2004/0261867 A1    Dec. 30, 2004

(51) Int. Cl.
*F16K 15/14* (2006.01)
*B60H 1/24* (2006.01)

(52) U.S. Cl. ............ 137/854; 137/512.15; 137/315.33; 454/162

(58) Field of Classification Search ................ 137/852, 137/854, 855, 856, 512.15; 454/162, 164
See application file for complete search history.

(56) References Cited

U.S. PATENT DOCUMENTS

| 3,891,000 | A | * | 6/1975 | Melnick ..................... 137/855 |
| 4,640,293 | A | | 2/1987 | Garbe |
| 5,105,849 | A | | 4/1992 | Clough |
| 5,355,910 | A | | 10/1994 | Gies et al. |
| 5,419,739 | A | | 5/1995 | Lewis |
| 5,601,117 | A | | 2/1997 | Lewis et al. |
| 5,904,618 | A | | 5/1999 | Lewis |
| 6,135,543 | A | | 10/2000 | Esposito et al. |
| 6,210,266 | B1 | * | 4/2001 | Barton ....................... 454/162 |
| 6,357,473 | B1 | | 3/2002 | Porter et al. |

FOREIGN PATENT DOCUMENTS

| EP | 0915302 | 5/1999 |
| FR | 1321824 | 5/1962 |

\* cited by examiner

*Primary Examiner*—Ramesh Krishnamurthy
(74) *Attorney, Agent, or Firm*—Tarolli, Sundheim, Covell & Tummino L.L.P.

(57) ABSTRACT

A pressure relief valve (10) includes a housing (20) defining an air flow passage (34). A flap (90) overlies the air flow passage (34). At least a portion (92, 94) of the flap (90) is movable, in response to an air pressure differential acting on opposite portions of the flap, between an open condition venting air from one side (18) of the valve (10) to a closed condition blocking flow of air from a second side (19) of the valve. The flap (90) has a plurality of mounting openings (104, 106). The housing (20) has a plurality of generally T-shaped mounting posts (70, 72) projecting from the housing. A snap connection is provided between the flap (90) and the mounting posts (70, 72) to secure the flap to the housing (20) with the mounting posts extending through the openings (104, 106). The mounting posts (70, 72) are the only structure holding the flap (90) on the housing (20).

11 Claims, 3 Drawing Sheets

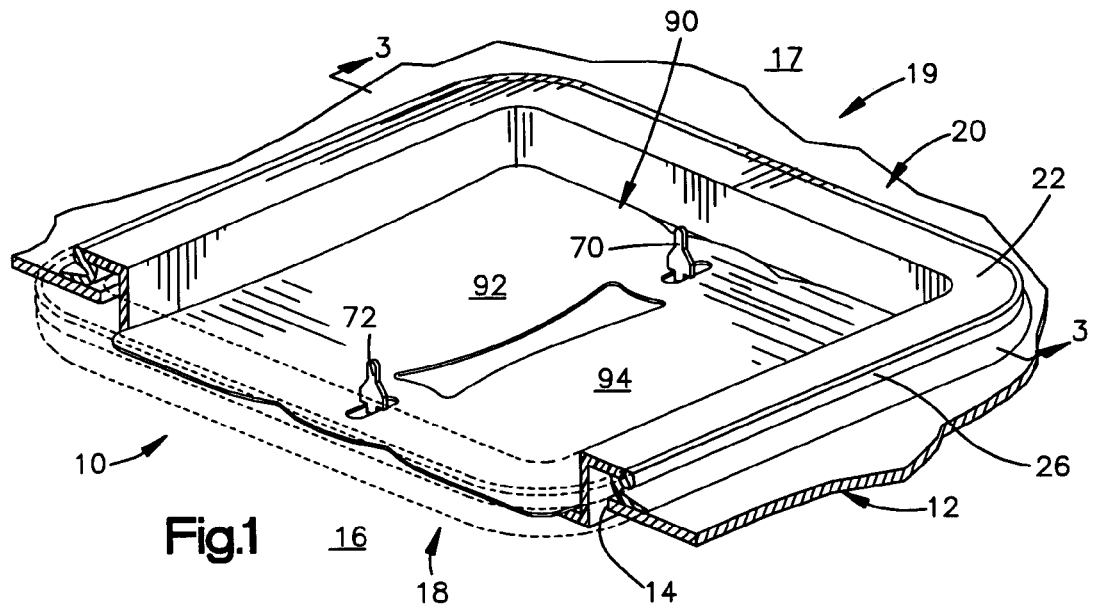
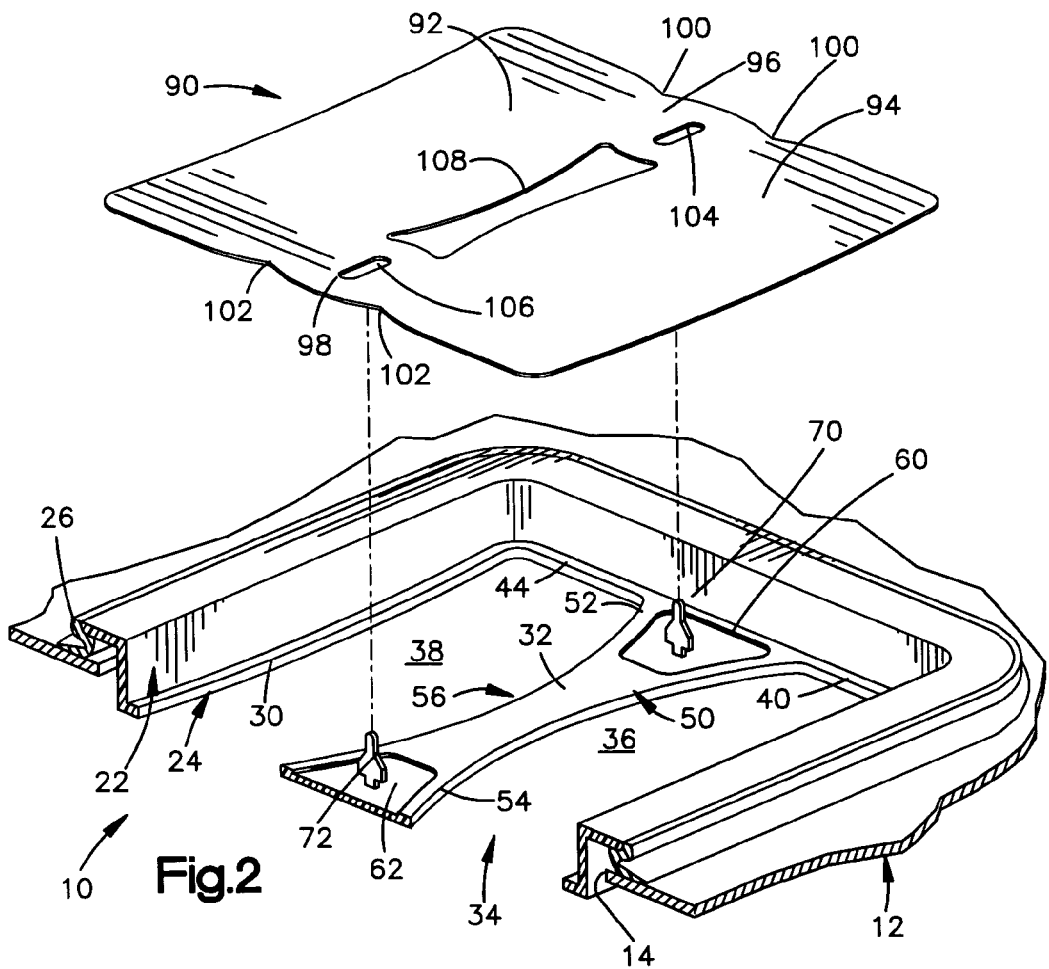

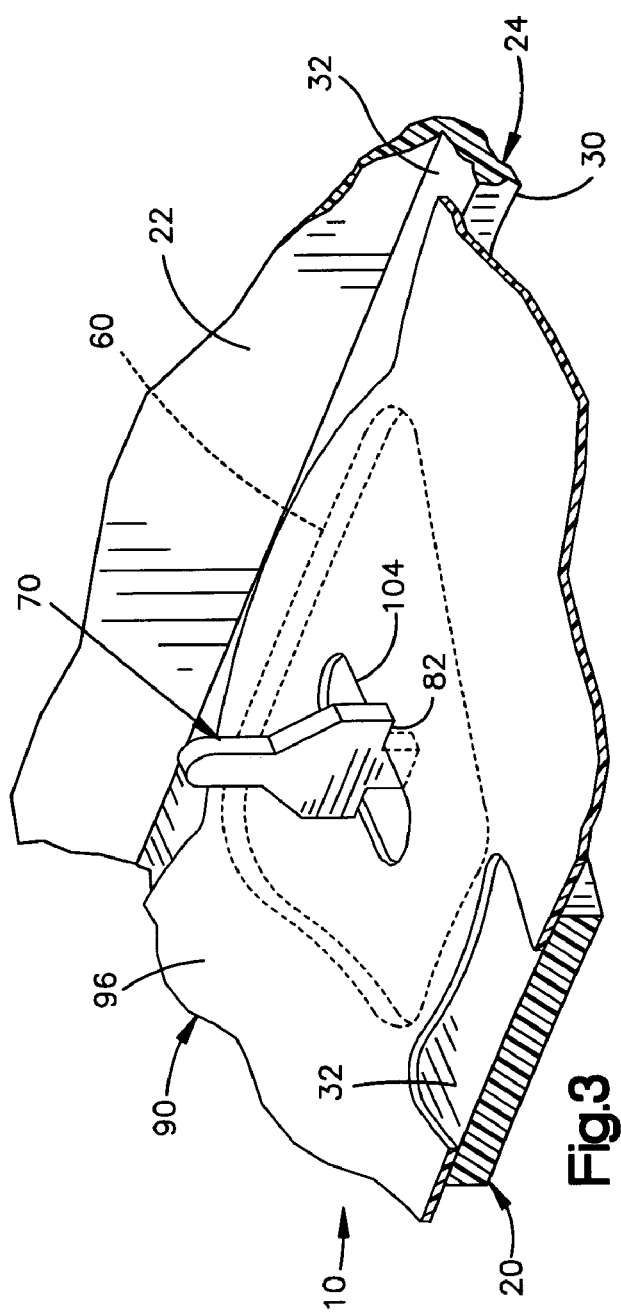
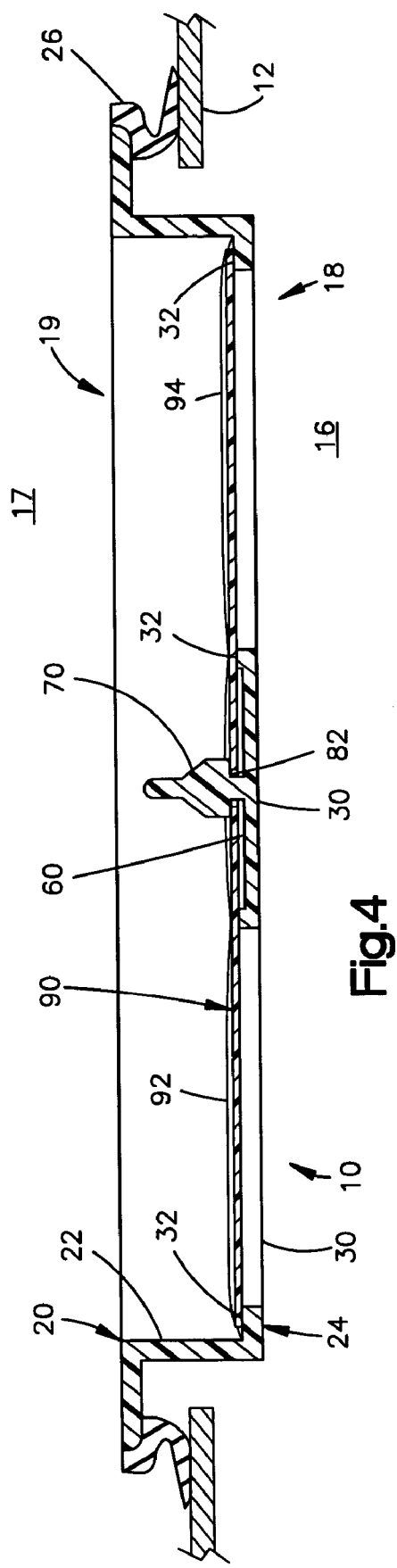
Fig.3
Fig.4

FLAP-TYPE VEHICLE CABIN EXHAUSTER

BACKGROUND OF THE INVENTION

1. Technical Field

The present invention relates to a vehicle cabin exhauster. In particular, the present invention relates to a flap-type pressure relief valve.

2. Description of the Prior Art

U.S. Pat. No. 6,357,473 discloses a vehicle cabin exhauster including a vent plate that is fixed in the vehicle and that has vent openings. A movable vent flap is connected with the vent plate. When the air pressure inside the vehicle is less than the outside air pressure, the vent flap is in a closed condition overlying the vent plate and closing the vent openings, to block flow of outside air into the vehicle. When the pressure differential across the vent openings changes so that the air pressure inside the vehicle is greater than the outside air pressure, the vent flap moves to an open condition enabling flow of inside air out of the vehicle. The vent flap may be secured to the vent plate by adhesive, rivets, screws, clips, heat staking, or a separate bracket.

It is known to attach a vent flap of the type shown in U.S. Pat. No. 6,357,473 to a vent plate by bending the flap so that the edges of the flap can be fitted under projections on the vent plate. The edges of the flap are received under the projection, to retain the flap on the vent plate. Other portions of the flap fit around other projections on the vent plate to block lateral movement of the flap on the vent plate. The vent flap is made from Mylar.

U.S. Pat. No. 5,419,739 discloses a flap-type pressure relief valve. The flap is held onto a frame by a necked-down portion of the flap that extends through an opening in the frame.

U.S. Pat. No. 5,601,117 discloses a flap-type pressure relief valve. A pin on a frame extends through a hole in the flap. A retainer bar overlies the flap. The pin is cold-headed after the flap is inserted, to hold the retainer bar, and thereby the flap, in place.

In one known embodiment of the invention of U.S. Pat. No. 5,601,117, the flap is made from a thin, flexible rubber material. The pins are T-shaped posts having widened portions that are outside of and hold down the retainer bar. The retainer bar is needed to hold the flap in place on the housing, because the rubber material of the flap can tear off the T-posts.

SUMMARY OF THE INVENTION

The present invention relates to a pressure relief valve for venting air from a first side of the valve to a second side of the valve and for blocking flow of air from the second side of the valve to the first side of the valve. The valve includes a housing having a base portion defining an air flow passage, and a flap positioned to overlie the air flow passage. At least a portion of the flap is movable relative to the base portion of the housing in response to an air pressure differential acting on opposite portions of the flap. The flap portion is movable between an open condition for venting air from the first side of the valve to the second side of the valve and a closed condition for blocking flow of air from the second side of the valve to the first side of the valve. The flap has a plurality of mounting openings. The housing has a plurality of generally T-shaped mounting posts projecting from the base portion of the housing. The flap has portions adjacent the openings that cooperate with the mounting posts to provide a snap connection between the flap and the mounting posts to secure the flap to the housing with the mounting posts extending through the openings. The mounting posts are the only structure holding the flap on the housing.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a perspective view of a portion of a pressure relief valve in accordance with the present invention, shown in an assembled condition mounted in a panel of a vehicle;

FIG. 2 is an exploded perspective view of the valve of FIG. 1;

FIG. 3 is an enlarged view of a portion of the valve of FIG. 1;

FIG. 4 is a sectional view taken generally along line 3—3 of FIG. 1; and

DETAILED DESCRIPTION OF THE INVENTION

Figure 5:
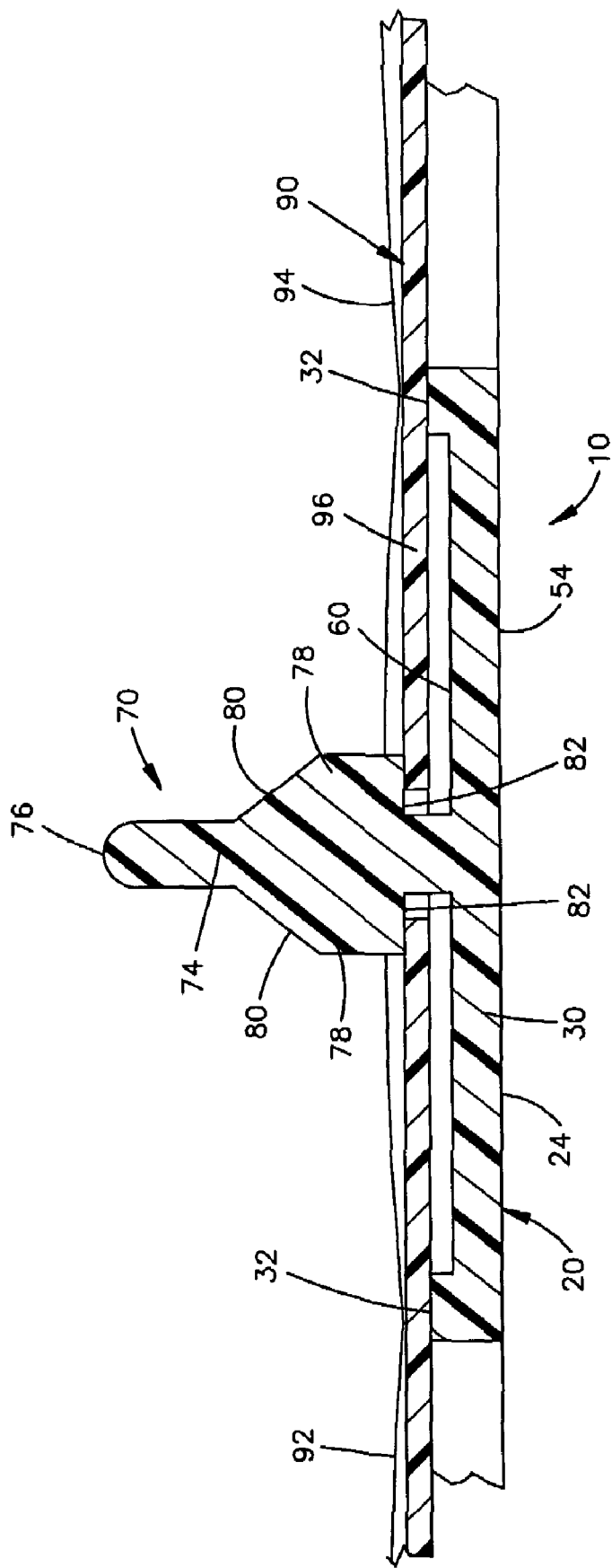
FIG. 5 is an enlarged view of a portion of FIG. 4.

The present invention relates to a vehicle cabin exhauster. In particular, the present invention relates to a flap-type pressure relief valve. As representative of the present invention, FIGS. 1–5 illustrate a valve 10 constructed in accordance with the invention.

The valve 10 is mounted in a vehicle, a portion of which is shown at 12. The vehicle portion 12 is a portion of a panel defining an opening 14 in which the valve 10 is mounted. The panel 12 may be, for example, a side panel of the vehicle trunk. The panel separates an interior space 16 of the vehicle such as the vehicle trunk, which is to be vented, from the exterior 17 of the vehicle. The valve 10 has an interior side 18 and an exterior side 19. The valve 10 is operable, as described below, to vent air from the interior 16 of the vehicle to the exterior 17, while blocking the flow of outside air into the interior of the vehicle.

The valve 10 includes a housing 20 and a flap 90. The housing 20, in the illustrated embodiment, is made from molded plastic. The housing 20 could be made from other materials, and in a manner other than molding.

The housing 20 includes a side wall portion 22 and a base portion 24. The side wall portion 22 of the housing 20 projects from the base wall portion 24 and extends around the base wall portion. The side wall portion 22 of the housing 20 is mounted on the panel with a seal 26 to secure the valve 10 to the vehicle.

The base portion 24 of the housing 20 includes a base wall 30 located inside the side wall portion 22. The base wall 30 has an upwardly facing (as viewed in FIG. 2) flap engagement surface 32.

The base wall 30 of the housing 20 defines an air flow passage 34 for passage of air from the interior 16 of the vehicle to the exterior 17 of the vehicle. In the particular valve 10 illustrated herein, the air flow passage 34 comprises two identical vent openings 36 and 38 that extend completely through the base wall 30 and through the flap engagement surface 32 of the base wall. The air flow passage 34 could take a different configuration. The vent opening 36 has an upper (as viewed in FIG. 2) end 40 and a lower end (not shown). The vent opening 38 has an upper end 44 and a lower end (not shown). The housing 20 has no through holes, from the interior 16 to the exterior 17, other than the vent openings 36 and 38.

The base wall 30 includes a separator bar 50 that extends between and separates the two vent openings 36 and 38. The separator bar 50 has a first end portion or upper end portion 52 located between the upper end 40 of the first vent opening 36 and the upper end 44 of the second vent opening 38. A second end portion or lower end portion 54 of the separator bar is located between the lower end of the first vent opening 36 and the lower end of the second vent opening 38. An intermediate portion 56 of the separator bar 50 is disposed between the upper end portion 52 and the lower end portion 54.

The intermediate portion 56 of the separator bar 50 is narrower than the upper and lower end portions 52 and 54. As a result, each one of the two vent openings 36 and 38 is wider in the middle than at its upper and lower ends. The flap engagement surface 32 of the base wall 30 of the housing 20 has a first radius of curvature about an axis extending generally perpendicular to the length of the separator bar 50.

The base portion 24 of the housing 20 includes two post recesses 60 and 62. The upper post recess 60 is located in the upper end portion 52 of the separator bar 50. The lower post recess 62 is located in the lower end portion 54 of the separator bar 50. The post recesses 60 and 62 are portions of the base wall 30 that are of reduced thickness but that are not openings extending completely through the base wall. The flap engagement surface 32 is discontinuous at the post recesses 60 and 62 because of the reduced material thickness.

The base portion 24 of the housing 20 includes two mounting posts 70 and 72. The mounting posts 70 and 72 are portions of the housing 20 that secure the flap 90 to the housing 20. The mounting posts 70 and 72 have a generally T-shaped configuration and project from the base portion 24 of the housing 20, in a direction toward the exterior side 19 of the valve 10.

The upper mounting post, or tee post, 70 projects from the upper post recess 60 in the base portion 24 of the housing 20. The lower mounting post, or tee post, 72 projects from the lower post recess 62 in the base portion 24 of the housing 20. The tee posts 70 and 72 project past the flap engagement surface 32. The tee posts 70 and 72 are identical to each other.

Each one of the tee posts 70 and 72 includes a central portion 74 that extends from the post recess to an outer end surface 76 of the post. Two wings or arms 78 project laterally in opposite directions from the central portion 74. Each one of the wings 78 has an outer surface 80 that faces away from the base wall 30 and extends at an acute angle to the central portion 74. Each one of the wings 78 also has a flap engagement surface 82. The flap engagement surfaces 82 on the wings 78 face the level of the flap engagement surface 32 of the base wall 30, and extend roughly parallel to the flap engagement surface of the base wall. The distance between the flap engagement surfaces 82 on the wings 78 and the flap engagement surface 32 on the base wall 30 is slightly larger than the thickness of the flap 90, as described below.

The flap 90 is a flexible, semi-stiff member made from an airtight material. The preferred material is DuPont Mylar A (registered trademark). This is a flexible synthetic film used as a base for adhesive or pressure sensitive tapes for marking, packaging, or strapping applications; as a base for magnetized sound recording, video, or control tape; as a base for metallic yarn; or as a base for scribing material used in cartography or drafting; and for further manufacture in the industrial arts.

The material of the flap 90 is flexible within its elastic range. The material is able to be formed to a preset radius of curvature, and will return to the preformed curve after being bent out of that preformed curve. The material of the flap 90 is also chemical resistant for automotive applications. The thickness of the material ranges from 0.003" to 0.005".

The flap 90 is formed as one piece and includes two cover portions 92 and 94 that are joined to each other by two hinge portions 96 and 98. The cover portion 92 is roughly the same shape as, but slightly large in all dimensions than, the vent opening 36. Similarly, the cover portion 94 is roughly the same shape as, but slightly large in all dimensions than, the vent opening 38.

The upper edge of the flap 90 is indented or cut away at two locations 100 to help define the upper hinge portion 96. Similarly, the lower edge of the flap 90 is indented or cut away at two locations 102 to help define the lower hinge portion 98. The hinge portions 96 and 98 are located adjacent and between the cover portions 92 and 94. The flap 90 also has a long, dog-bone shaped central opening 108 in its center, extending between and partially defining the hinge portions 96 and 98.

The upper hinge portion 96 has a mounting opening or slot 104 extending through the material of the flap 90. Similarly, the lower hinge portion 98 has a mounting opening or slot 106 extending through the material of the flap 90.

To assemble the valve 10, the flap 90 is positioned over the housing 20. The slots 104 and 106 in the flap 90 are positioned over the tee posts 70 and 72, respectively. The flap 90 is pushed straight down onto the housing 20 and snaps over the tee posts 70 and 72 to connect the flap with the housing. The tee posts 70 and 72 are the only structure holding the flap 90 on the housing 20. The material of the flap 90, that surrounds the slots 104 and 106, deforms outwardly, enlarging the slots. This deformation provides room for the wings 78 of the tee posts 70 and 72 to pass through the slots 104 and 106. The post recesses 60 and 62 provide space for the hinge portions 96 and 98 of the flap 90 to be pressed downward sufficiently to move under the wings 78 of the tee posts 70 and 72. After the wings 78 of the tee posts 70 and 72 pass through the slots 104 and 106, respectively, the material of the flap 90 returns to its original state.

When the flap 90 is thus mounted on the housing 20, the flap engagement surfaces 82 on the tee posts 70 and 72 face the base wall 30 of the housing. The wings 78 on the tee posts 70 and 72 are wider than the slots 104 and 106. As a result, the flap engagement surfaces 82 on the tee posts 70 and 72 are positioned to engage the flap 90, press the flap down against the flap engagement surface 32 of the housing 20, and block removal of the flap from the housing. The flap engagement surfaces 82 on the tee posts 70 and 72 may be spaced slightly from the level of the flap engagement surface 32 to allow for thermal expansion as needed.

The flap 90 has a second radius of curvature, about an axis parallel to the axis of curvature of the flap engagement surface 32 of the base wall 30 of the housing 20. The second radius of curvature, of the flap 90, is greater than the first radius of curvature, of the flap engagement surface 32 of the base wall 30. As a result, the cover portions 92 and 94 of the flap 90 are naturally pressed against the flap engagement surface 32 of the housing 20, covering the vent openings 36 and 38 in the housing wall 30. The flap 90 is therefore gravity independent and the valve 10 can be mounted at any orientation relative to the vertical.

If the air pressure in the vehicle interior space 16 (on the first side 18 of the valve 10) is less than the air pressure in the outside space 17 (on the second side 19 of the valve), then the pressure differential keeps the cover portions 92 and 94 of the flap 90 pressed against the flap engagement surface 32 of the housing 20. This engagement blocks the flow of outside air into the vehicle interior 16.

If the air pressure in the vehicle interior 16 (on the first side 18 of the valve 10) becomes greater than the air pressure in the outside space 17 (on the second side 19 of the valve), then the pressure differential causes the cover portions 92 and 94 of the flap 90 to deform and bend at least partially away from the flap engagement surface 32 of the housing 20. This movement enables the flow of air out of the vehicle interior 16 through the valve 10.

If the pressure differential across the valve 10 becomes even greater, the flap 90 bends at the hinge portions 96 and 98. The cover portions 92 and 94 of the flap 90 move bodily away from the base wall 24 of the housing 20. This movement enables an increased rate of flow of air out of the vehicle interior 16 through the valve 10.

When the pressure differential across the valve 10 decreases again, the cover portions 92 and 94 of the flap 90 return to their original condition pressed against the flap engagement surface 32 of the housing 20. The difference in the radii of curvature of the flap 90 and the flap engagement surface 32 helps to keep the flap pressed tightly against the base wall 30 of the housing 20.

From the above description of the invention, those skilled in the art will perceive improvements, changes and modifications in the invention. Such improvements, changes and modifications within the skill of the art are intended to be covered by the appended claims.

Having described the invention, I claim:

1. A pressure relief valve for venting air from a first side of said valve to a second side of said valve and for blocking flow of air from the second side of said valve to the first side of said valve, said valve comprising:
   a housing having a base portion defining an air flow passage; and
   a flap positioned to overlie said air flow passage, at least a portion of said flap being movable relative to said base portion of said housing in response to an air pressure differential acting on a first surface of said flap and a second opposite surface of said flap, said at least a portion of said flap being movable between an open condition for venting air from the first side of said valve to the second side of said valve and a closed condition for blocking flow of air from the second side of said valve to the first side of said valve;
   said flap having a plurality of mounting openings, said mounting openings each defining an elongated slot, said slots each defining a longitudinal axis extending parallel to both said first surface of said flap and said second surface of said flap,
   said housing having a plurality of generally T-shaped mounting posts projecting from said base portion of said housing, said mounting posts each having a planar configuration defined by a first planar surface and an opposite second planar surface, said first and second planar surfaces extending away from said housing through said flap, said first and second planar surfaces of each mounting post extending perpendicularly to said longitudinal axis defined by each said mounting opening,
   said flap having portions adjacent said openings that cooperate with said mounting posts to provide a snap connection between said flap and said mounting posts to secure said flap to said housing with said mounting posts extending through said openings;
   said mounting posts being the only structure holding said flap on said housing.

2. A valve as set forth in claim 1 wherein said flap is made from Mylar.

3. A valve as set forth in claim 1 wherein
   said base portion of said housing includes a base wall having a flap engagement surface against which said flap portions lie when closed,
   each one of said T-shaped mounting posts includes first and second laterally projecting arms, each one of said arms having an engagement surface facing said base wall of said housing,
   said flap having first and second opposite major side surfaces between which said mounting openings extend,
   said engagement surfaces of said arms of said mounting post being engageable with said first major side surface of said flap to block movement of said flap away from said housing, said second major side surface of said flap being engageable with said flap engagement surface on said base wall of said housing to close said air flow passage.

4. A valve as set forth in claim 1 wherein said flap has material portions surrounding and defining said openings, said material portions being deformable from a first condition to a second condition in response to engagement with said T-shaped mounting posts to enable movement of said flap over said posts in a direction toward said flap engagement surface of said housing, said material portions of said flap substantially returning from the second condition to the first condition after said flap is mounted on said mounting posts of said housing.

5. A valve as set forth in claim 1 wherein said base portion of said housing includes a base wall having said flap engagement surface, said mounting posts of said housing base portion projecting from recessed areas of said base wall.

6. A valve as set forth in claim 1 wherein said housing is free of through holes other than said flow passage between said first side of said valve and said second side of said valve.

7. A valve as set forth in claim 1 wherein said flap is made from Mylar;
   said base portion of said housing has a flap engagement surface against which said flap portions lie when closed;
   each one of said T-shaped mounting posts includes first and second laterally projecting arms, each one of said arms having an engagement surface facing said base portion of said housing;
   said flap having first and second opposite major side surfaces between which said mounting openings extend;
   said engagement surfaces of said arms of said mounting posts being engageable with said first major side surface of said flap to block movement of said flap away from said housing, said second major side surface of said flap being engageable with said flap engagement surface of said base portion of said housing to close said air flow passage; and
   said flap has material portions surrounding and defining said openings, said material portions being deformable from a first condition to a second condition in response to engagement with said T-shaped mounting posts to enable movement of said flap over said posts in a direction toward said flap engagement surface of said housing, said material portions of said flap substantially returning from the second condition to the first condition after said flap is mounted on said mounting posts of said housing.

8. A pressure relief valve for venting air from a first side of said valve to a second side of said valve and for blocking flow of air from the second side of said valve to the first side of said valve, said valve comprising:

a housing having a base portion defining an air flow passage, said housing having a plurality of generally T-shaped mounting posts projecting from said base portion of said housing in a direction toward said second side of said valve, and a Mylar flap having portions positioned to overlie said flow passage, said flap having a plurality of mounting openings through which said T-shaped mounting posts extend, said mounting openings being disposed along a centerline of said flap such that said flap comprises a first cover portion on one side of said mounting openings and a second cover portion on another opposite side of said mounting openings, said T-shaped mounting posts having portions holding said flap on said housing, at least a portion of said first and said second cover portions of said flap being movable relative to said base portion of said housing in response to an air pressure differential acting on opposite portions of said flap, said at least a portion of said flap being movable between an open condition for venting air from the first side of said valve to the second side of said valve and a closed condition for blocking flow of air from the second side of said valve to the first side of said valve, wherein said flap has material portions surrounding and defining said mounting openings, said material portions being deformable from a first condition to a second condition in response to engagement with said T-shaped mounting posts to enable movement of said flap over said posts in a direction toward said flap engagement surface of said housing, said material portions of said flap substantially returning from the second condition to the first condition after said flap is mounted on said mounting posts of said housing.

9. A valve as set forth in claim 8 wherein said base portion of said housing includes a wall having a flap engagement surface against which said flap portions lie when closed, each one of said T-shaped mounting posts includes first and second laterally projecting arms, each one of said arms having an engagement surface facing said wall on said base portion of said housing, said flap having first and second opposite major side surfaces between which said mounting openings extend, said engagement surfaces of said arms of said mounting posts being engageable with said first major side surface of said flap to block movement of said flap away from said housing, said second major side surface of said flap being engageable with said flap engagement surface of said base portion of said housing to close said air flow passage.

10. A valve as set forth in claim 8 wherein said base portion of said housing includes a base wall having said flap engagement surface, said mounting posts of said housing base portion projecting from recessed areas of said base wall.

11. A valve as set forth in claim 8 wherein said housing is free of through holes other than said flow passage between said first side of said valve and said second side of said valve.

* * * * *